(12) United States Patent
Huelsmann

(10) Patent No.: US 11,459,005 B2
(45) Date of Patent: Oct. 4, 2022

(54) ULTRA-CLEAN MANUALLY-ACTUATED CLAMPING BRAKE

(71) Applicant: Raytheon Company, Waltham, MA (US)

(72) Inventor: Eric P. Huelsmann, Tucson, AZ (US)

(73) Assignee: Raytheon Company, Waltham, MA (US)

(*) Notice: Subject to any disclaimer, the term of this patent is extended or adjusted under 35 U.S.C. 154(b) by 164 days.

(21) Appl. No.: 17/081,876

(22) Filed: Oct. 27, 2020

(65) Prior Publication Data

US 2022/0126893 A1    Apr. 28, 2022

(51) Int. Cl.
| | | |
|---|---|---|
| *F16D 63/00* | (2006.01) | |
| *B61H 7/12* | (2006.01) | |
| *B61H 13/00* | (2006.01) | |
| *F16C 29/02* | (2006.01) | |
| *F16C 29/00* | (2006.01) | |
| *B61H 13/02* | (2006.01) | |
| *F16D 125/30* | (2012.01) | |
| *F16D 121/16* | (2012.01) | |

(52) U.S. Cl.
CPC ............. *B61H 7/12* (2013.01); *B61H 13/005* (2013.01); *B61H 13/02* (2013.01); *F16C 29/008* (2013.01); *F16C 29/02* (2013.01); *F16D 63/008* (2013.01); *F16D 2121/16* (2013.01); *F16D 2125/30* (2013.01)

(58) Field of Classification Search
CPC .............. F16D 63/008; F16D 2121/16; F16D 2125/30; B61H 7/12; B61H 13/005; B61H 13/02; F16C 29/008; F16C 29/02

USPC ........................................................... 188/43
See application file for complete search history.

(56) References Cited

U.S. PATENT DOCUMENTS

| | | |
|---|---|---|
| 2,456,100 A | 12/1948 | Wood |
| 2,835,291 A | 5/1958 | Blatt et al. |
| 2,921,486 A | 1/1960 | Burke |
| 3,125,236 A | 3/1964 | Huff |
| 3,170,214 A | 2/1965 | Cochrane |

(Continued)

FOREIGN PATENT DOCUMENTS

| | | |
|---|---|---|
| CN | 201486387 U | 5/2010 |
| CN | 107514434 A | 12/2017 |

(Continued)

OTHER PUBLICATIONS

Entegris WaferCare, "Wafer Handling Systems", www.wafercare.com, Dec. 2015, 1 page.

(Continued)

*Primary Examiner* — Xuan Lan Nguyen

(57) ABSTRACT

A system includes a carriage configured to move along a rail. The system also includes a clamping brake configured to selectively allow and prevent movement of the carriage along the rail. The clamping brake includes multiple brake pads configured to be moved inward to lock onto the rail and to be moved outward to release the rail. The clamping brake also includes multiple springs configured to apply spring forces that cause the brake pads to move inward and lock onto the rail. The clamping brake further includes a camshaft coupled to or including multiple eccentrics. The eccentrics are configured to overcome the spring forces and cause the brake pads to move outward and release the rail.

20 Claims, 8 Drawing Sheets

(56) References Cited

U.S. PATENT DOCUMENTS

| | | | |
|---|---|---|---|
| 3,181,541 | A | 5/1965 | Brooking |
| 3,204,947 | A | 9/1965 | Sendoykas |
| 3,623,620 | A | 11/1971 | Vermette |
| 3,727,778 | A | 4/1973 | Hollenbach |
| 3,850,111 | A | 11/1974 | Hansen |
| 3,924,844 | A | 12/1975 | Bachtel, Jr. |
| 4,108,589 | A | 8/1978 | Bunch |
| 4,141,543 | A | 2/1979 | Kato |
| 4,257,583 | A | 3/1981 | Carson |
| 4,335,873 | A | 6/1982 | Kiefer |
| 4,422,218 | A | 12/1983 | Brasseux |
| 4,456,228 | A | 6/1984 | Cable et al. |
| 4,545,722 | A | 10/1985 | Cutkosky et al. |
| 4,678,390 | A | 7/1987 | Bonneton et al. |
| 4,804,307 | A | 2/1989 | Motoda |
| 5,165,148 | A | 11/1992 | Fleischer et al. |
| 5,351,415 | A | 10/1994 | Brooks et al. |
| 5,460,452 | A * | 10/1995 | Hara ............... F16C 29/10 384/45 |
| 5,527,024 | A | 6/1996 | Dysktra |
| 5,547,421 | A | 8/1996 | Scheetz |
| 5,642,811 | A | 7/1997 | Hubner et al. |
| 5,678,663 | A * | 10/1997 | Watanabe ............ F16C 29/008 188/67 |
| 5,732,799 | A * | 3/1998 | Chikamatsu ............ F16C 29/10 188/67 |
| 5,772,193 | A | 6/1998 | Dykstra |
| 5,788,082 | A | 8/1998 | Nyseth |
| 5,921,535 | A | 7/1999 | Lutz, III |
| 5,924,685 | A | 7/1999 | Webb |
| 6,056,499 | A | 5/2000 | Bressner |
| 6,131,704 | A | 10/2000 | Viita-Aho et al. |
| 6,257,821 | B1 | 7/2001 | Ward et al. |
| 6,336,528 | B1 * | 1/2002 | Rudy ............... F16C 29/10 188/170 |
| 6,374,465 | B1 | 4/2002 | Dykstra |
| 6,595,507 | B2 | 7/2003 | Dykstra |
| 6,598,756 | B1 | 7/2003 | Rosenfeldt |
| 6,652,213 | B1 | 11/2003 | Mitchell et al. |
| 6,817,603 | B2 | 11/2004 | Kofod |
| 6,932,335 | B1 | 8/2005 | Dykstra |
| 7,370,398 | B2 | 5/2008 | Gosis et al. |
| 7,607,835 | B2 * | 10/2009 | Keller ............... F16C 29/0633 74/89.32 |
| 7,621,515 | B2 | 11/2009 | Jurcinsky et al. |
| 7,648,131 | B2 | 1/2010 | Hagan et al. |
| 7,743,938 | B2 | 6/2010 | Wu |
| 7,845,255 | B2 | 12/2010 | Heinsohn |
| 8,123,205 | B2 | 2/2012 | Martin |
| 8,366,371 | B2 | 2/2013 | Maniscalco et al. |
| 8,523,201 | B2 | 9/2013 | Allen |
| 8,613,433 | B2 | 12/2013 | Poole et al. |
| 8,827,255 | B2 | 9/2014 | Woods |
| 9,010,222 | B2 | 4/2015 | Peirce |
| 9,163,440 | B2 | 10/2015 | Hagan et al. |
| 9,316,262 | B2 | 4/2016 | Muller et al. |
| 9,757,842 | B2 | 9/2017 | Huelsmann |
| 9,758,276 | B2 | 9/2017 | Doggett et al. |
| 10,358,258 | B2 | 7/2019 | Doggett et al. |
| 2004/0065224 | A1 | 4/2004 | Gilbert et al. |
| 2004/0099492 | A1 * | 5/2004 | Onuki ............... H02K 7/1023 188/163 |
| 2004/0105733 | A1 | 6/2004 | Hewitt |
| 2005/0179235 | A1 | 8/2005 | Stewart et al. |
| 2006/0045672 | A1 | 3/2006 | Maynard et al. |
| 2009/0178946 | A1 | 7/2009 | Patstone et al. |
| 2014/0252935 | A1 | 9/2014 | McAdoo |
| 2014/0326087 | A1 | 11/2014 | Salguero Beltran et al. |
| 2015/0307253 | A1 | 10/2015 | Paoli |
| 2016/0137343 | A1 | 5/2016 | Weng |
| 2016/0168880 | A1 | 6/2016 | Phelan |
| 2016/0318157 | A1 | 11/2016 | Souris et al. |

FOREIGN PATENT DOCUMENTS

| | | |
|---|---|---|
| DE | 9016964 U1 | 4/1992 |
| DE | 19714861 C1 | 8/1998 |
| DE | 102011118538 A1 | 5/2013 |
| DE | 102012205203 A1 | 10/2013 |
| DE | 102014114295 A1 | 4/2016 |
| DE | 102014115432 A1 | 4/2016 |
| EP | 1413398 A2 | 4/2004 |
| EP | 1433571 A1 | 6/2004 |
| FR | 2601609 A1 | 1/1988 |
| GB | 719634 A | 12/1954 |
| GB | 778865 A | 7/1957 |
| GB | 1128416 A | 9/1968 |
| WO | 2011/099946 A2 | 8/2011 |

OTHER PUBLICATIONS

"Alum-a-lift Ergonomic Material Handling Lifts", http://alum-a-lift.com, Dec. 2015, 2 pages.

"Wire Shelving", www.metro.com/shelving/wire-shelving, Dec. 2015, 3 pages.

"Storgae Bins", http://www.metro.com/accessories/storage-bins, Dec. 2015, 3 pages.

* cited by examiner

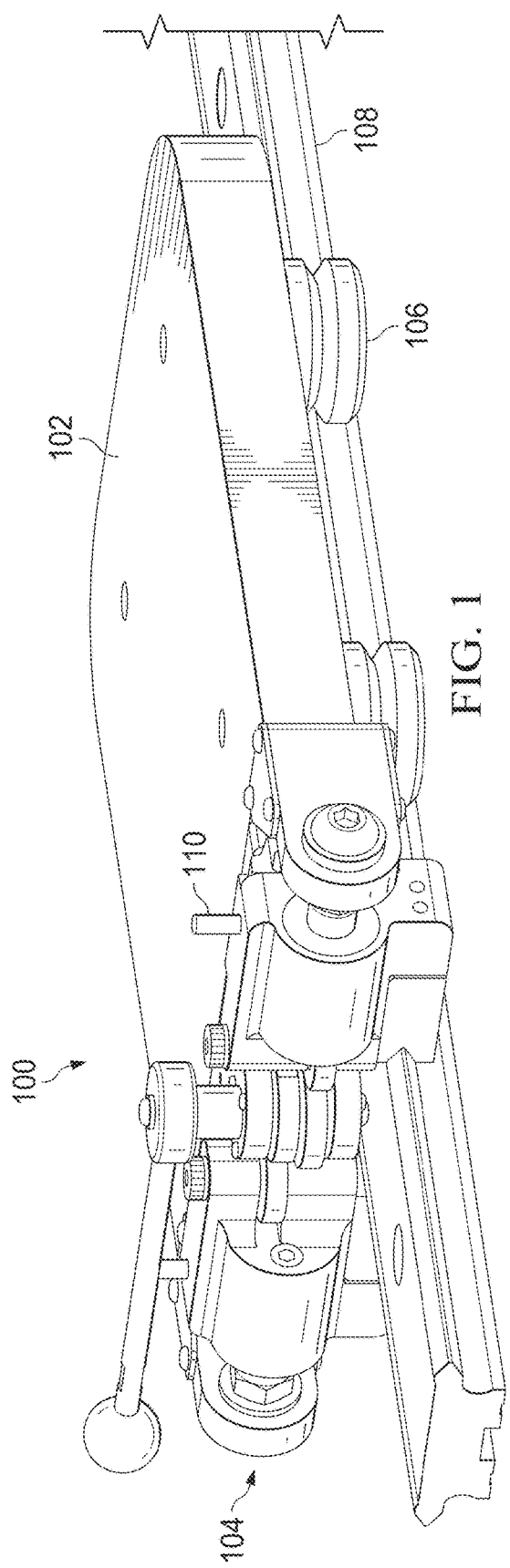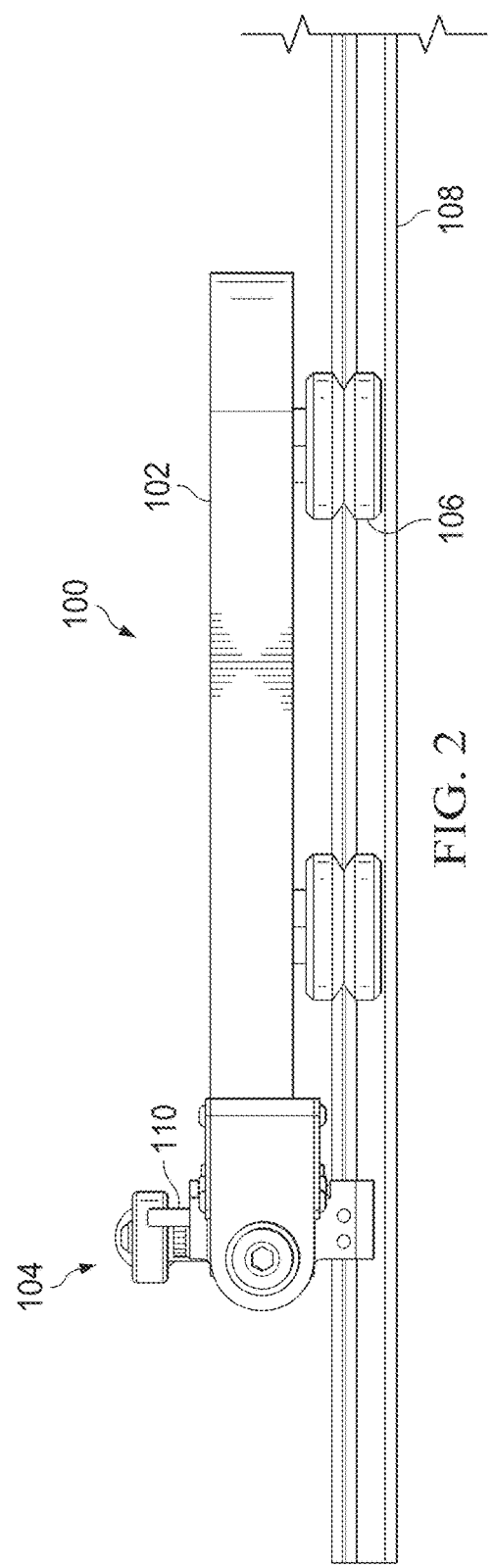

ULTRA-CLEAN MANUALLY-ACTUATED CLAMPING BRAKE

TECHNICAL FIELD

This disclosure generally relates to braking systems. More specifically, this disclosure relates to an ultra-clean manually-actuated clamping brake.

BACKGROUND

Various industries use rail-based systems to transport materials or objects, such as within facilities. For example, manufacturing facilities often use rail-based systems to support material handling operations such as positioning, transportation, and assembly operations. More and more industries and organizations are using common or standardized rail systems, such as rail systems having rails of standardized shapes and dimensions. One example of a rail system is a "dual V" rail system in which carriages ride on rails that have opposing V-shaped edges. In these or other types of rail systems, locking devices (also known as "clamping brakes") are typically used to arrest movement of carriages on the rails in order to lock the carriages in place on the rails.

SUMMARY

This disclosure provides an ultra-clean manually-actuated clamping brake.

In a first embodiment, an apparatus includes multiple brake pads configured to be moved inward to lock onto a rail and to be moved outward to release the rail. The apparatus also includes multiple springs configured to apply spring forces that cause the brake pads to move inward and lock onto the rail. The apparatus further includes a camshaft coupled to or including multiple eccentrics. The eccentrics are configured to overcome the spring forces and cause the brake pads to move outward and release the rail.

In a second embodiment, a system includes a carriage configured to move along a rail. The system also includes a clamping brake configured to selectively allow and prevent movement of the carriage along the rail. The clamping brake includes multiple brake pads configured to be moved inward to lock onto the rail and to be moved outward to release the rail. The clamping brake also includes multiple springs configured to apply spring forces that cause the brake pads to move inward and lock onto the rail. The clamping brake further includes a camshaft coupled to or including multiple eccentrics. The eccentrics are configured to overcome the spring forces and cause the brake pads to move outward and release the rail.

In a third embodiment, a method includes applying spring forces that cause multiple brake pads to move inward and lock onto a rail. The method also includes rotating a camshaft coupled to or including multiple eccentrics. The method further includes overcoming the spring forces using the eccentrics and causing the brake pads to move outward and release the rail.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which:

FIGS. 1 and 2 illustrate an example rail system with a carriage having an ultra-clean manually-actuated clamping brake according to this disclosure;

DETAILED DESCRIPTION

Figure 3:
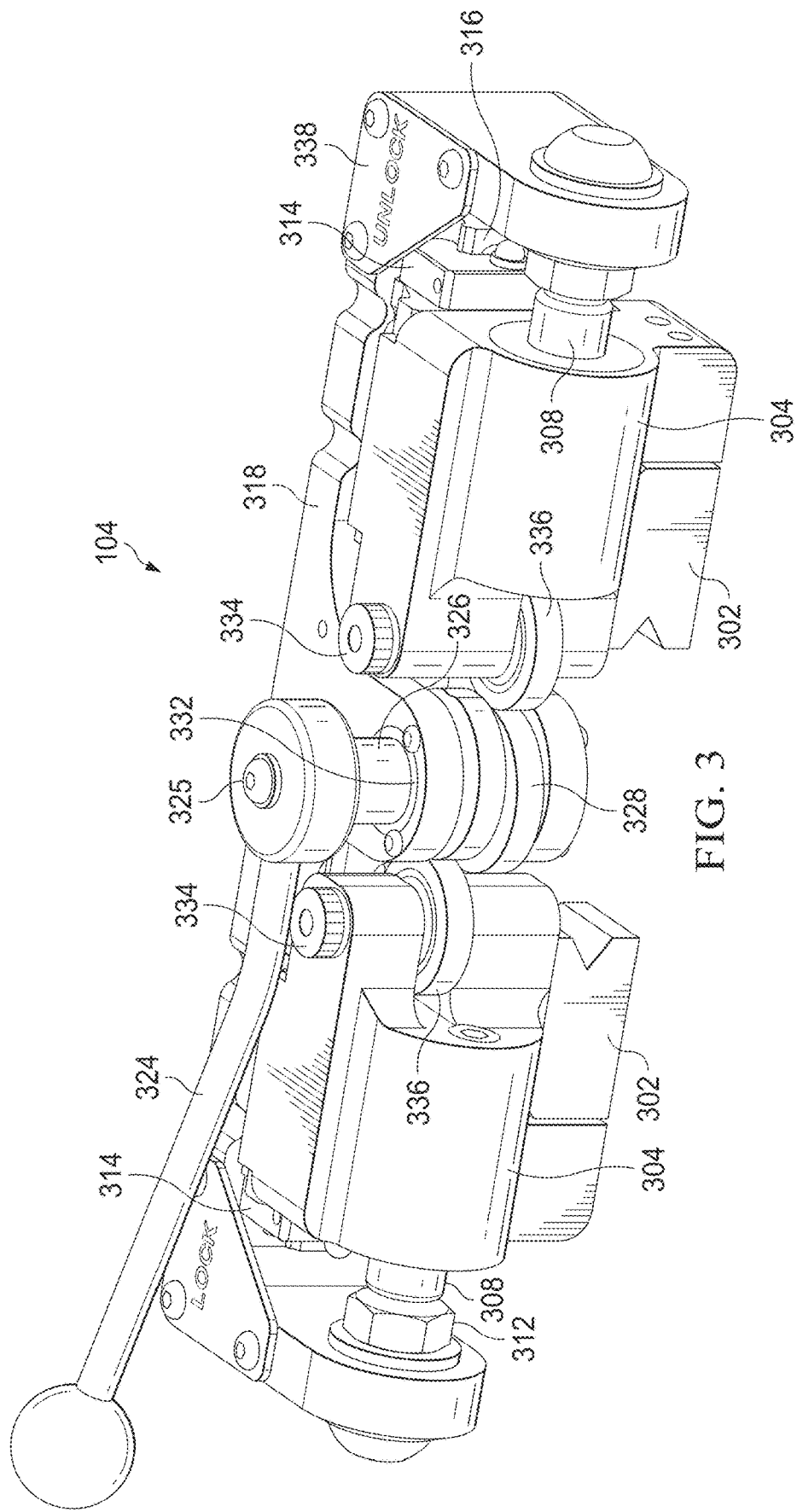
FIGS. 3 and 4 illustrate a first example ultra-clean manually-actuated clamping brake according to this disclosure.

FIGS. 1 through 11, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

As noted above, various industries use rail-based systems to transport materials or objects, such as within facilities. For example, manufacturing facilities often use rail-based systems to support material handling operations such as positioning, transportation, and assembly operations. More and more industries and organizations are using common or standardized rail systems, such as rail systems having rails of standardized shapes and dimensions. One example of a rail system is a "dual V" rail system in which carriages ride on rails that have opposing V-shaped edges. In these or other types of rail systems, locking devices (also known as "clamping brakes") are typically used to arrest movement of carriages on the rails in order to lock the carriages in place on the rails.

Some clamping brakes include components that slide against each other when locking and unlocking the clamping brakes, such as when clamps are actuated via screw threads or when pins are physically inserted into openings of rails. Unfortunately, this sliding motion can produce particulate contamination, which can be problematic in various situations, such as when the clamping brakes are used in critical environment applications (like cleanrooms) where particulate contamination is a major concern. Particulate contamination can (among other things) lead to hardware failures and quality defects in products being manufactured. As particular examples, particulate contamination can lead to hardware failures and quality defects in space seekers and other optical devices. Also, these types of clamping brakes can have relatively low clamping force capabilities, can present ergonomic risks to users, and may not allow for infinite location positioning. Other clamping brakes used in rail systems use electric actuators or hydraulic/pneumatic actuators, which rely on utility connections or other external connections and may still have issues with infinite location positioning. In addition, clamping brakes often have limited brake pad profile capabilities, meaning the clamping brakes are limited in the size and shape of the brake pads that can be used with the clamping brakes.

This disclosure provides various ultra-clean manually-actuated clamping brakes that can be used with carriages or other structures that move along rails. As described in more detail below, each clamping brake includes multiple braking pads that can be used to contact a rail in order to lock or brake a carriage or other structure in place on the rail. Nitrogen springs or other springs can be used to apply inward pressure on the braking pads so that, when a clamping brake is in a locked configuration, the braking pads maintain contact with a rail to prevent movement of the carriage or other structure along the rail. An eccentric dual-lobed camshaft can be used in conjunction with revolving cam followers in order to push the braking pads away from the rail when a clamping brake is in an unlocked configuration, thereby allowing movement of the carriage or other structure along the rail.

The clamping brakes disclosed here rely on rotation rather than sliding action to engage and disengage the clamping brakes, which can significantly reduce the amount of particulate contamination produced by the clamping brakes. The clamping brakes disclosed here are also self-contained and manually-actuated devices that allow for "untethered" infinite location capabilities, meaning the clamping brakes can be manually locked at any desired location along a rail and do not rely on a connection to external utilities (such as for electrical power or hydraulic/pneumatic action). Moreover, the clamping brakes disclosed here can be used with high loads, meaning the clamping brakes can be used with carriages or other structures carrying large masses of materials or objects. Further, in some embodiments, the clamping brakes disclosed here can use modular braking pads of various designs, which enables the use of the clamping brakes with a wide variety of rail profiles and friction coefficients. In addition, in embodiments that use nitrogen springs or other "chargeable" springs, desired clamping forces can be generated by suitable charging of the springs to support an adjustable capacity for the clamping brakes. This can also be done without impacting the size, design, or stroke of the springs, and common spring constraints such as solid height and spring fatigue can be significantly reduced or eliminated.

The clamping brakes disclosed here can be used in any suitable environment. Example applications for the clamping brakes can include use with carriages and rail-based systems in cleanrooms, sterile environments, medical environments, and space-based environments. Specific example applications for the clamping brakes can include use with carriages and rail-based systems in manufacturing environments for optics, semiconductor devices, or other devices in which particulate contamination is undesired.

FIGS. 1 and 2 illustrate an example rail system 100 with a carriage 102 having an ultra-clean manually-actuated clamping brake 104 according to this disclosure. As shown in FIGS. 1 and 2, the carriage 102 represents a structure on which materials or objects can be placed for transport. The carriage 102 may be formed from any suitable material(s), such as one or more metals, and in any suitable manner. The carriage 102 may also have any suitable size, shape, and dimensions. In this example, the carriage 102 is shown as having a generally rectangular shape with rounded corners, and top and bottom surfaces of the carriage 102 are generally planar. However, the carriage 102 may have any other suitable configuration as needed or desired.

The carriage 102 includes multiple wheels 106 that are configured to be positioned on opposite sides of a rail 108 and to move along the rail 108. In this particular example, the carriage 102 includes two pairs of wheels 106, where each pair of wheels 106 includes one wheel 106 positioned on one side of the rail 108 and another wheel 106 positioned on the opposite side of the rail 108. In this way, the wheels 106 are used to receive and capture the rail 108 between the wheels 106 so that the carriage 102 can travel along the rail 108. In this example, each wheel 106 is attached to the bottom surface of the carriage 102, and each wheel 106 is configured to rotate about an axis that is perpendicular to the bottom surface of the carriage 102. However, other arrangements for the wheels 106 may be used. Also, in this example, each wheel 106 includes a V-shaped groove that is configured to contact a V-shaped portion of the rail 108. However, this is based on the specific type of rail 108 being used here and can vary based on the size and shape of the rail 108. Each wheel 106 may be formed from any suitable material(s), such as one or more low-particulating materials like polytetrafluoroethylene (PTFE), and in any suitable manner. Each wheel 106 may also have any suitable size, shape, and dimensions, and any number of wheels 106 may be used with the carriage 102. In particular embodiments, the carriage 102 and wheels 106 may represent a HEPCOMOTION SL2 slide from BISHOP WISECARVER GROUP.

The rail 108 represents an elongated structure along which the carriage 102 can travel. In some cases, the rail 108 may represent a linear structure that allows the carriage 102 to move back and forth linearly between two or more locations. However, in other embodiments, the rail 108 may represent a non-linear structure. The rail 108 may be formed from any suitable material(s), such as one or more metals, and in any suitable manner. The rail 108 may also have any suitable size, shape, and dimensions. In this particular example, the rail 108 represents a "dual V" rail having opposing V-shaped edges that are positioned at or near the top of the rail 108. However, the rail 108 may have any other desired size and shape based on particular needs. In particular embodiments, the rail 108 may represent an SS-NL rail from BISHOP WISECARVER GROUP.

The clamping brake 104 represents a braking or locking device that can be used to selectively brake or lock the carriage 102 in place along the rail 108, thereby preventing travel of the carriage 102 along the rail 108 until unlocked. As described in more detail below, the clamping brake 104 can be manually-actuated, meaning the clamping brake 104 is engaged and disengaged manually by an operator. The clamping brake 104 can also be ultra-clean, meaning the clamping brake 104 produces little if any particulate contamination. Among other ways, this is achieved using components that rotate rather than slide against each other (although some small amount of sliding may still occur during use). In some cases, the clamping brake 104 produces so little particulate contamination that it can be rated for cleanroom operation. Further, the clamping brake 104 can support infinite location capabilities, meaning the clamping brake 104 can be locked at any desired location along the rail 108 (even at high loads). Beyond that, some embodiments of the clamping brake 104 can support untethered operation, meaning no connections to external utilities (such as for electrical power or hydraulic/pneumatic action) are needed. However, other embodiments of the clamping brake 104 may be plumbed to support functions like automated control, remote actuation, remote monitoring, and/or higher load capacities. Moreover, some embodiments of the clamping brake 104 can support the use of nitrogen springs or other "chargeable" springs, which can be charged as needed to provide desired clamping forces and which can eliminate common spring design constraints like solid height and spring fatigue. This may also help to reduce or minimize the amount of force that an operator applies to the handle of the clamping brake 104 in order to lock and unlock the clamping brake 104. In addition, the clamping brake 104 can support very high clamping forces in a compact package, may be more ergonomic than other clamping brakes, and may have a reduced overall complexity compared to other clamping brakes. Finally, some embodiments of the clamping brake 104 can support the use of modular brake pads, which allows for easy exchange of the brake pads and therefore use of the clamping brake 104 with various types of rails 108 and with different types of brake pad materials.

In some embodiments, the clamping brake 104 includes multiple hard stops 110, which can be used to limit travel of a handle of the clamping brake 104. The hard stops 110 can be formed from any suitable material(s), such as one or more low-particulating materials like PTFE, and in any suitable manner. The hard stops 110 can also have any suitable size, shape, and dimensions. Note, however, that other mechanisms may be used to limit the movement of the handle of the clamping brake 104. In other figures that are described below, the hard stops 110 may be omitted from the clamping brake 104 in those figures, although the hard stops 110 may be used with any of the clamping brakes 104 described below.

Although FIGS. 1 and 2 illustrate one example of a rail system 100 with a carriage 102 having an ultra-clean manually-actuated clamping brake 104, various changes may be made to FIGS. 1 and 2. For example, the size, shape, and dimensions of each component in the rail system 100 can vary as needed or desired. Also, while the clamping brake 104 here represents a separate structure that is bolted or otherwise coupled to the carriage 102, the clamping brake 104 may be formed integral with the carriage 102. In addition, the carriage 102 may be used with multiple rails 108, in which case multiple clamping brakes 104 might be used with the carriage 102.

Figure 4:
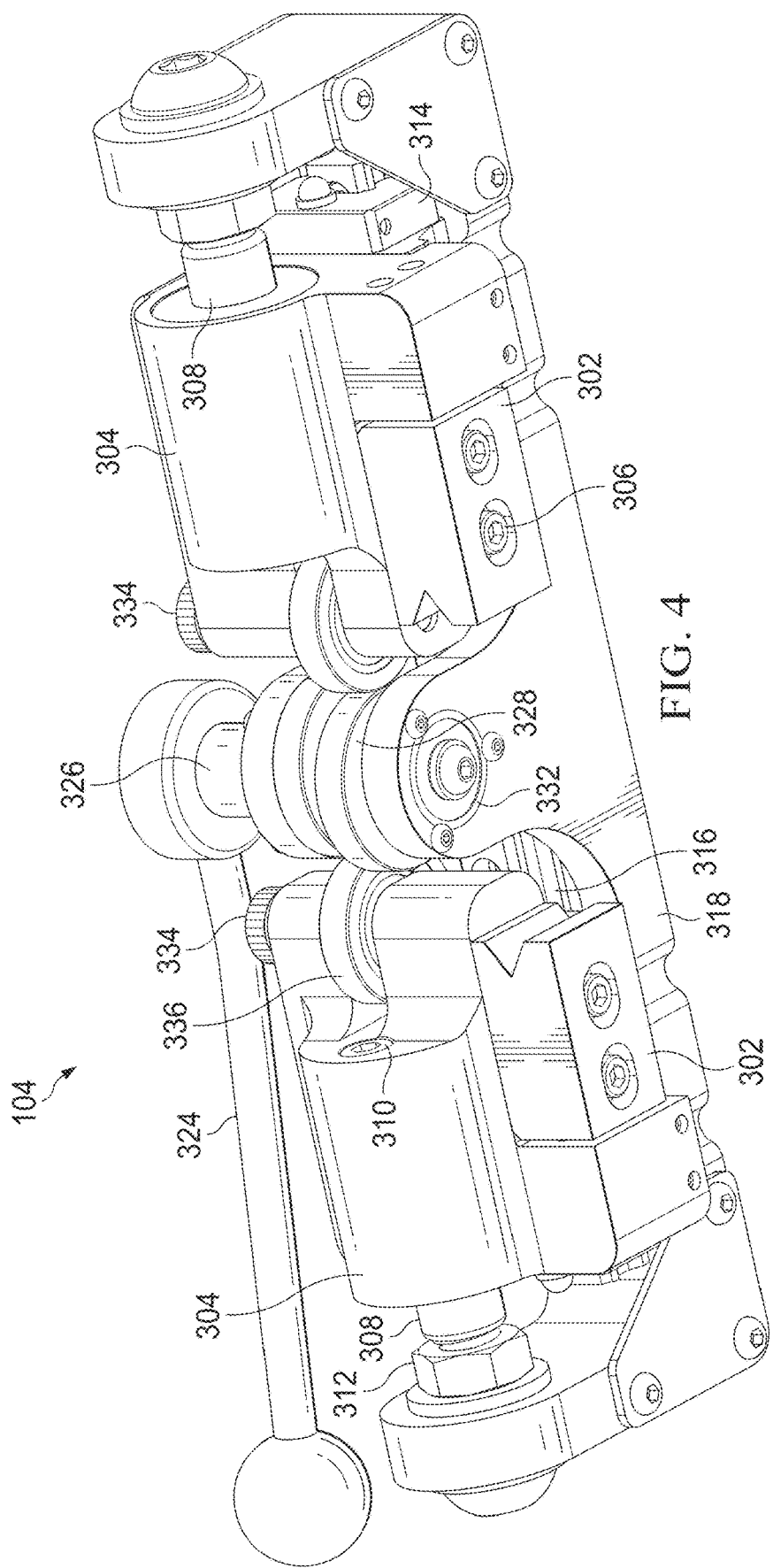
Figure 5:
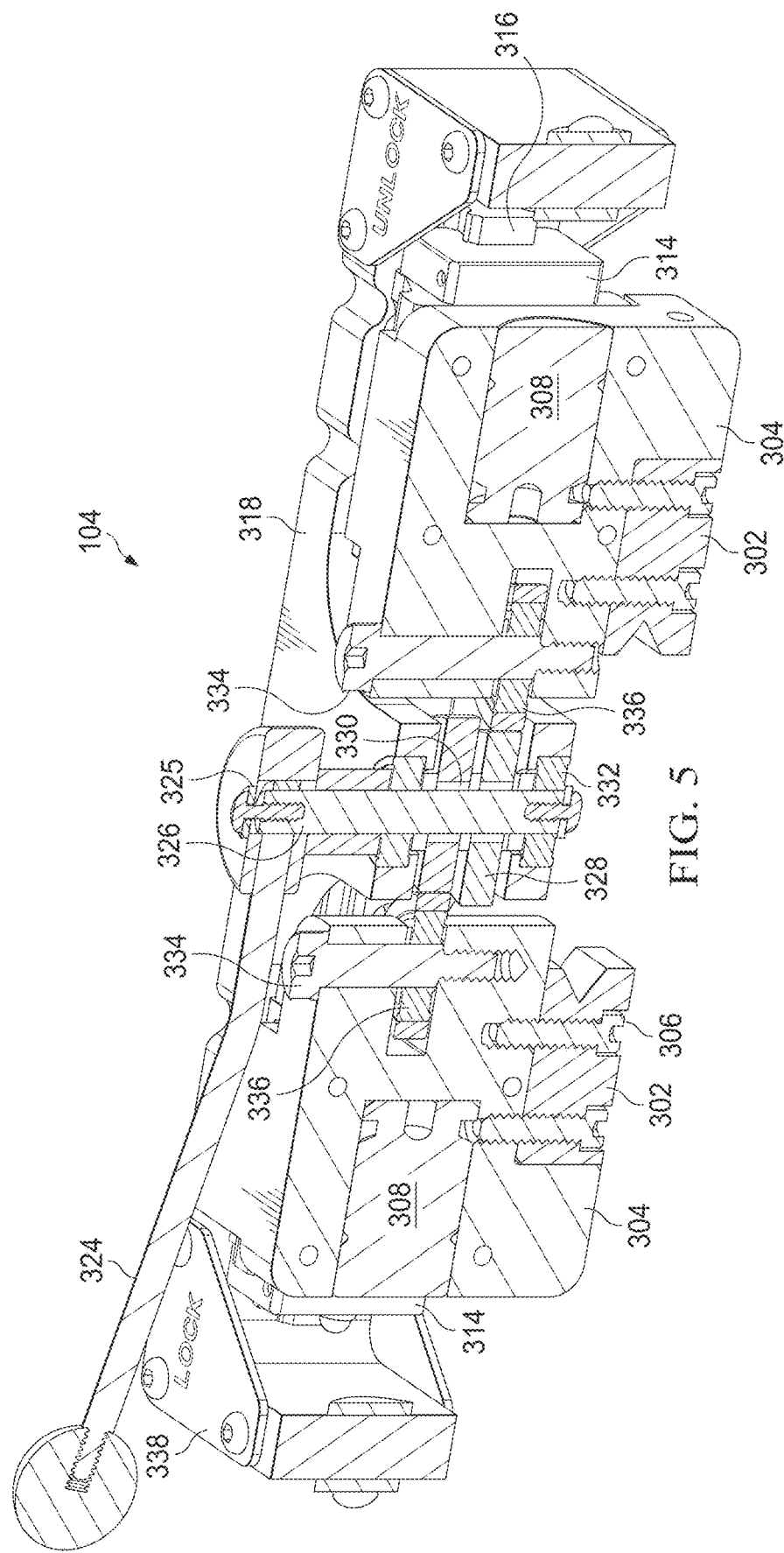
FIGS. 5 through 7 illustrate example cross-sections of the ultra-clean manually-actuated clamping brake from FIGS. 3 and 4 according to this disclosure.
Figure 6:
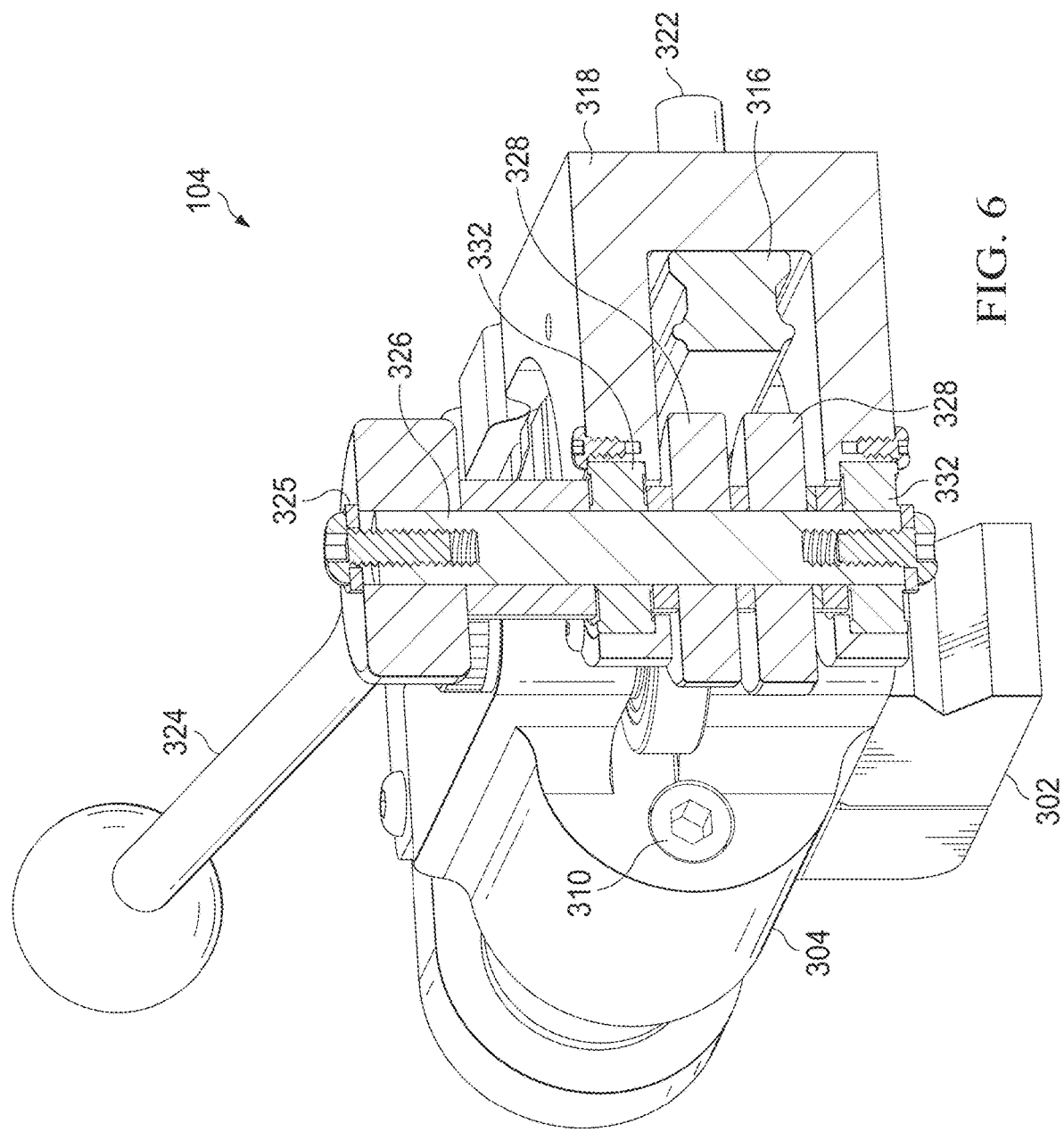
Figure 7:
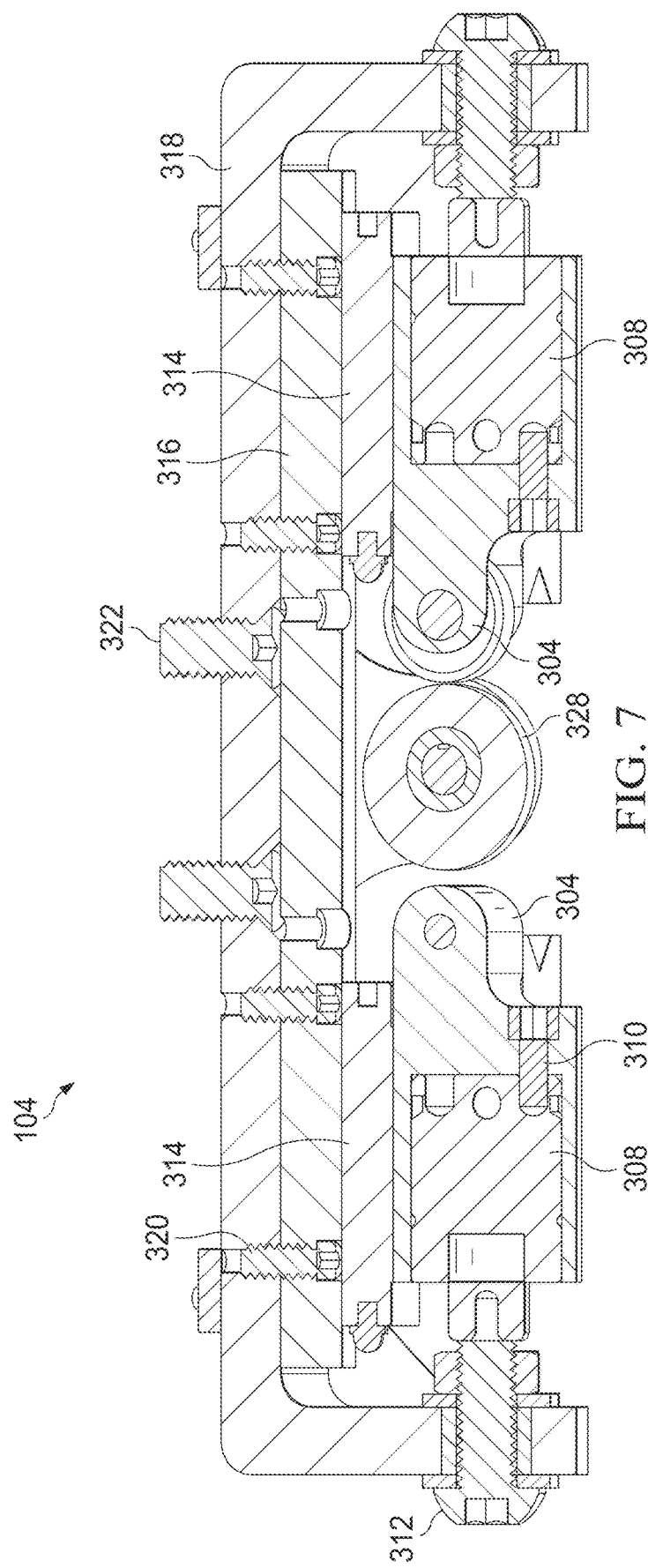

FIGS. 3 and 4 illustrate a first example ultra-clean manually-actuated clamping brake 104 according to this disclosure. Also, FIGS. 5 through 7 illustrate example cross-sections of the ultra-clean manually-actuated clamping brake 104 from FIGS. 3 and 4 according to this disclosure. More specifically, FIG. 5 illustrates a cross-section of the clamping brake 104 taken along a vertical plane extending across the length (side to side) of the clamping brake 104, FIG. 6 illustrates a cross-section of the clamping brake 104 taken along a vertical plane extending across the depth (front to back) of the clamping brake 104, and FIG. 7 illustrates a cross-section of the clamping brake 104 taken along a horizontal plane extending across the length of the clamping brake 104. For ease of explanation, the clamping brake 104 shown in FIGS. 3 through 7 is described as being used with the carriage 102 in the rail system 100 of FIGS. 1 and 2. However, the clamping brake 104 shown in FIGS. 3 through 7 may be used with any other suitable device and in any other suitable system.

As shown in FIGS. 3 through 7, the clamping brake 104 includes multiple brake pads 302. The brake pads 302 are positioned so as to receive the rail 108 between the brake pads 302, and the brake pads 302 are configured to contact the rail 108 when the clamping brake 104 is in a locked configuration. When the brake pads 302 are contacting the rail 108 in the locked configuration, the brake pads 302 apply a clamping force on the rail 108 that limits or prevents movement of a carriage 102 or other structure along the rail 108. Each of the brake pads 302 in this example includes a V-shaped groove that is configured to receive and contact a V-shaped edge of the rail 108, although the actual configuration of the brake pads 302 can vary based on the design of the rail 108. Each brake pad 302 can be formed from any suitable material(s), such as stainless steel, and in any suitable manner. Each brake pad 302 can also have any suitable size, shape, and dimensions.

The brake pads 302 are attached to respective mounting blocks 304 by bolts or other connectors 306. The mounting blocks 304 represent structures that can be moved inward and outward as described below in order to lock and unlock the clamping brake 104 on the rail 108. Each mounting block 304 can be formed from any suitable material(s), such as one or more metals, and in any suitable manner. Each mounting block 304 can also have any suitable size, shape, and dimensions. In some embodiments, the brake pads 302 are modular, and the brake pads 302 can be quickly and easily connected to and removed from the mounting blocks 304 as needed or desired. This would allow, for instance, replacement of the brake pads 302 due to wear caused over time, due to use of the clamping brake 104 with a specific type or profile of rail 108, or to support the use of different materials in the brake pads 302.

Nitrogen springs or other chargeable springs 308 are arranged and configured to apply inward forces to the mounting blocks 304, which thereby applies inward forces to the brake pads 302. When the clamping brake 104 is in the locked configuration, the chargeable springs 308 apply the forces needed to hold the brake pads 302 against the rail 108, which helps to hold the carriage 102 or other structure in place on the rail 108. When the clamping brake 104 is in an unlocked configuration, the forces applied by the chargeable springs 308 are overcome (as described below) in order to move the brake pads 302 away from the rail 108, which allows movement of the carriage 102 or other structure along the rail 108. In some cases, the chargeable springs 308 may be attached to the mounting blocks 304 by bolts or other connectors 310. Each chargeable spring 308 represents any suitable structure configured to apply a spring force and that can be charged, such as a cylinder for receiving nitrogen or other gas. The amount of charging for each chargeable spring 308 affects the amount of clamping force applied by the brake pads 302 on the rail 108. Each chargeable spring 308 can be formed from any suitable material(s) and in any suitable manner. Each chargeable spring 308 may have any suitable size, shape, and dimensions.

In some embodiments, the amount of force applied by the chargeable springs 308 can be adjusted somewhat using preloads 312, each of which is implemented using a bolt and a nut in this example. The amount of preload force on a chargeable spring 308 may, for example, be controlled based on the number or size of washers placed under the head of the bolt in a preload 312 and/or the number or size of washers placed under the nut in a preload 312. This allows the inward forces applied by the chargeable springs 308 to be increased or decreased as needed or desired. Note, however, that other forms for the preloads 312 may be used, or the preloads 312 may be omitted from the clamping brake 104.

In this example, the mounting blocks 304 are attached to linear bearing blocks 314, which are configured to slide linearly along an internal rail 316. This helps to ensure that the brake pads 302 move linearly inward and outward as the clamping brake 104 is locked and unlocked. Each linear bearing block 314 represents any suitable structure configured to slide along an internal rail 316, such as an SHS15 linear motion guide from THK AMERICA, INC. Each linear bearing block 314 can be formed from any suitable material (s) and in any suitable manner. Each linear bearing block 314 can also have any suitable size, shape, and dimensions. The internal rail 316 represents any suitable structure configured to allow linear bearing blocks 314 to slide along the internal rail 316, such as an SHS rail from THK AMERICA, INC. The internal rail 316 can be formed from any suitable material(s) and in any suitable manner. The internal rail 316 can also have any suitable size, shape, and dimensions. The linear bearing blocks 314 and internal rail 316 collectively form a linear bearing, which in some embodiments can be rated for cleanroom operations.

A chassis 318 represents a housing or other structure that can receive and support other components of the clamping brake 104. The chassis 318 may also represent a ruggedized structure that provides protection to other components of the clamping brake 104. In this example, the chassis 318 can be secured to the internal rail 316 via one or more bolts or other connectors 320. Also, in some embodiments, the chassis 318 may be coupled to a carriage 102 or other structure using one or more bolts or other connectors 322. In other embodiments, the chassis 318 may represent an integral part of the carriage 102 or other structure. The chassis 318 may be formed from any suitable material(s), such as one or more metals, and in any suitable manner. The chassis 318 can also have any suitable size, shape, and dimensions.

The clamping brake 104 in this example is manually-actuated using a handle 324, which is coupled to a camshaft 326. The handle 324 represents any suitable structure configured to be moved back and forth by an operator. Note that the specific form of the handle 324 shown here is for illustration only and can vary as needed or desired. In this particular implementation, the handle 324 locks the clamping brake 104 when in a first position and unlocks the clamping brake 104 when in a second position, where the first and second positions are approximately 180° from each other. However, other angles may be used here. The handle 324 is attached to the camshaft 326 by a coupling arrangement 325, which in this example represents an annular structure that receives and retains the handle 324 and that is attached by the camshaft 326 by a bolt or other connector. However, any other suitable coupling arrangement may be used to attach the handle 324 to the camshaft 326, or the handle 324 and the camshaft 326 may be formed as an integral structure.

The camshaft 326 rotates based on rotation of the handle 324 by the operator. The camshaft 326 includes or is coupled to multiple eccentrics 328. Each eccentric 328 generally represents a circular or other structure that is mounted to or that forms a part of the camshaft 326, and each eccentric 328 extends in an asymmetric fashion from a central axis of the camshaft 326. For example, the central axis of the camshaft 326 may pass through each eccentric 328 at a location that is not a center of the eccentric 328. Each eccentric 328 is configured to push an associated one of the mounting blocks 304 outward to thereby move an associated one of the brake pads 302 outward in order to unlock the clamping brake 104. When the clamping brake 104 is locked, each eccentric 328 is configured to push the associated mounting block 304 outward to a lesser extent or to no extent, which allows the associated brake pad 302 to move inward and lock the clamping brake 104 on the rail 108. Also, the eccentrics 328 are arranged to push different ones of the mounting blocks 304 outward. In this way, the camshaft 326 and the eccentrics 328 form an "eccentric dual-lobed camshaft." The camshaft 326 may be formed from any suitable material(s) and in any suitable manner, and the camshaft 326 may have any suitable size, shape, and dimensions. Each eccentric 328 may be formed from any suitable material(s) and in any suitable manner, and each eccentric 328 may have any suitable size, shape, and dimensions.

In some embodiments, the camshaft 326 is keyed, such as on its top end and/or its bottom end, to help ensure that the camshaft 326 is installed correctly so that the eccentrics 328 are properly positioned to lock and unlock the clamping brake 104 in the expected positions of the handle 324. Also, in some embodiments, at least one key stock 330 (which may or may not form a part of the camshaft 326) may be used with each eccentric 328 and can help ensure that the eccentric 328 rotates with the camshaft 326. In addition, one or more sealed bearings 332 may be positioned around the camshaft 326 and between the chassis 318 and the camshaft 326 in order to ensure smooth rotation of the camshaft 326 and therefore the handle 324. In some embodiments, each sealed bearing 332 represents a double-sealed stainless steel bearing filled with a lubricant, such as KRYTOX, although other bearing 332 may be used here.

In order to facilitate primarily rotational motion (rather than sliding motion) to lock and unlock the clamping brake 104, cam followers are formed in the clamping brake 104 using bolts 334 or other structures that form axles for actuation bearings 336. The bolts 334 are used to secure the actuation bearings 336 to the mounting blocks 304 while allowing the actuation bearings 336 to rotate. The chargeable springs 308 generally push the mounting blocks 304 inward and may help to keep the actuation bearings 336 in contact with the eccentrics 328 (although there might be some separation between the actuation bearings 336 and the eccentrics 328 when the clamping brake 104 is unlocked). When the handle 324 is rotated by an operator to unlock the clamping brake 104, the eccentrics 328 coupled to the handle 324 rotate, and the rotating eccentrics 328 cause the actuation bearings 336 to rotate while pushing the mounting blocks 304 outward. When the handle 324 is rotated by an operator to lock the clamping brake 104, the eccentrics 328 coupled to the handle 324 again rotate, and the rotating eccentrics 328 allow the actuation bearings 336 to rotate while the chargeable springs 308 push the mounting blocks 304 inward. As a result, when the mounting blocks 304 move inward or outward linearly during locking or unlocking of the clamping brake 104, the eccentrics 328 and the actuation bearings 336 are rotating rather than sliding against each other. This can help to significantly reduce or eliminate particulate contamination created by the locking and unlocking of the clamping brake 104. In some embodiments, each actuation bearing 336 includes at least an outer-sleeved race that contacts the associated eccentric 328. The inner surface of the race may or may not be sleeved depending on the implementation.

As can be seen more clearly in FIG. 5, the eccentrics 328 are positioned at different locations along the camshaft 326, and the associated actuation bearings 336 are similarly positioned at different locations of the mounting blocks 304. This allows the multiple eccentrics 328 to engage the multiple mounting blocks 304 simultaneously based on the rotation of the handle 324. To support this, recesses in the mounting blocks 304 that receive the actuation bearings 336 are located at different heights within the mounting blocks 304.

In some embodiments, one or more labels 338 may be formed on or attached to the chassis 318 or other portion of the clamping brake 104 in order to identify the locked and unlocked positions for the handle 324. In this example, each label 338 is formed using an etched or other marked structure that is secured to the chassis 318 using screws or other connectors. However, any other suitable label(s) may be used with the clamping brake 104, or no labels may be provided.

Figure 8:
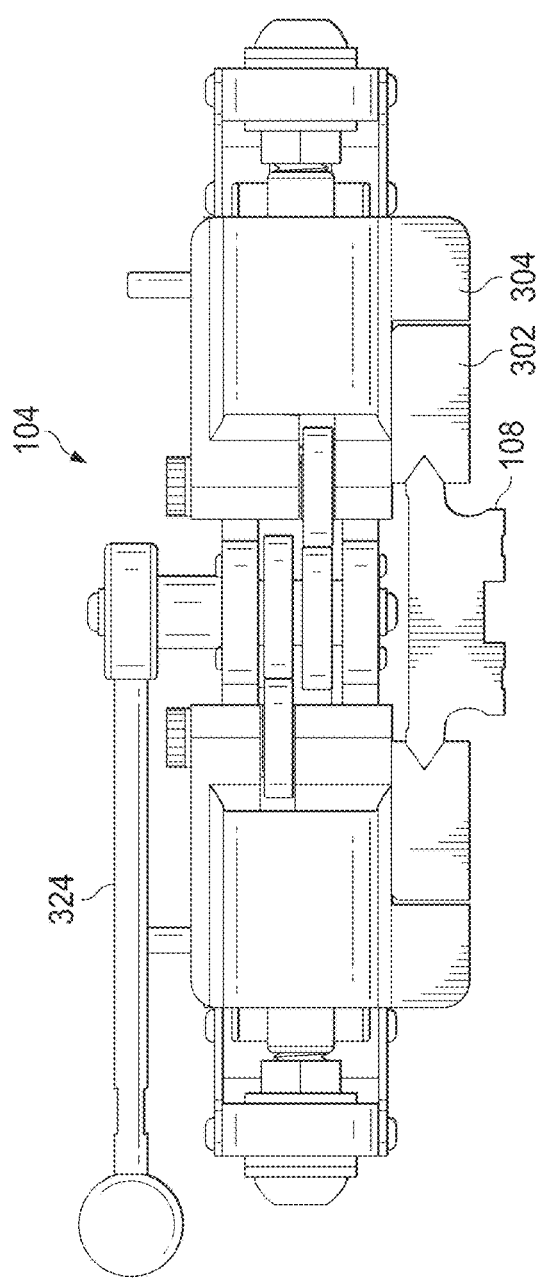
FIGS. 8 and 9 illustrate example locked and unlocked configurations of the ultra-clean manually-actuated clamping brake from FIGS. 3 and 4 according to this disclosure.
Figure 9:
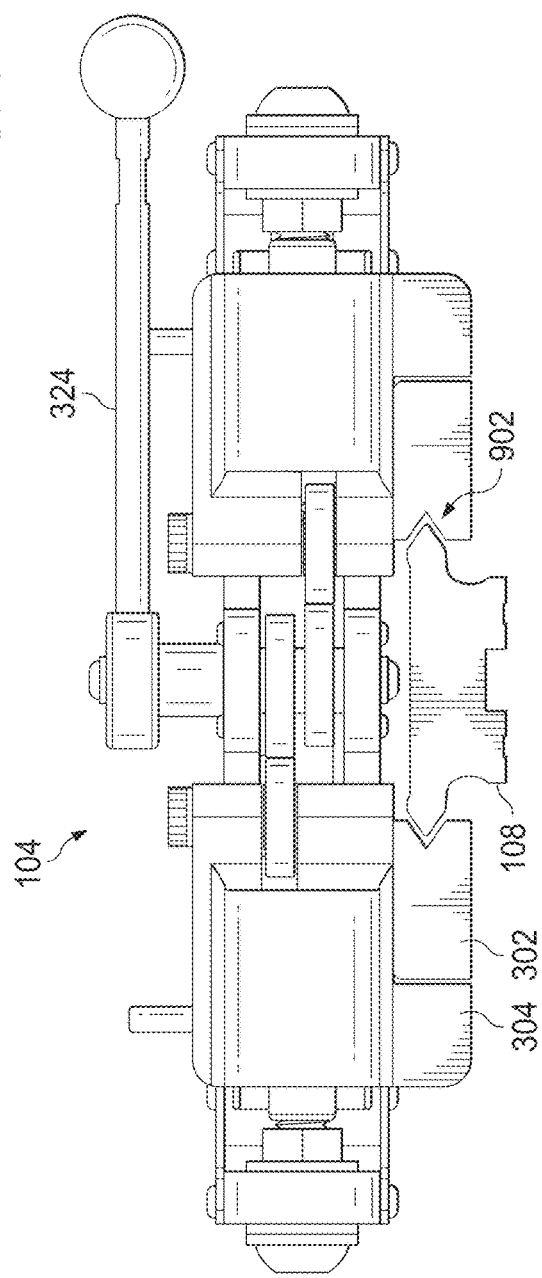

FIGS. 8 and 9 illustrate example locked and unlocked configurations of the ultra-clean manually-actuated clamping brake 104 from FIGS. 3 and 4 according to this disclosure. In FIG. 8, the handle 324 has been moved to the locked position, and the clamping brake 104 is secured to the rail 108. This is because the eccentrics 328 of the clamping brake 104 are pushing the mounting blocks 304 outward to a smaller extent or no extent, and the chargeable springs 308 are pushing the mounting blocks 304 and therefore the brake pads 302 inward to the maximum possible extent. This holds the brake pads 302 securely against the rail 108, preventing a carriage 102 or other structure from moving along the rail 108. The brake pads 302 here can provide a very large clamping force depending on the charging of the chargeable springs 308 and other design parameters of the clamping brake 104. In some embodiments, the clamping brake 104 may achieve clamping forces of up to one ton or more by the brake pads 302.

In FIG. 9, the handle 324 has been moved to the unlocked position, and the clamping brake 104 is no longer secured to the rail 108. This is because the eccentrics 328 of the clamping brake 104 are pushing the mounting blocks 304 outward to a larger extent, overcoming the spring forces of the chargeable springs 308 and pushing the mounting blocks 304 slightly outward. This creates gaps 902 between the brake pads 302 and the rail 108, allowing the carriage 102 or other structure to move along the rail 108. Note that the gaps 902 may be extremely small, such as only about 0.03 inches (about 0.762 millimeters), but this can be adequate to unlock the clamping brake 104 from the rail 108 and allow movement of the carriage 102 or other structure along the rail 108. Smaller gaps 902 are typically adequate for linear rails 108, while larger gaps 902 may typically be needed for non-linear rails 108 due to the curvature of the non-linear rails 108. The use of a relatively long handle 324 and small gaps 902 here may require application of only a small amount of force at the handle 324 in order to lock and unlock the clamping brake 104.

Note that, in some embodiments, the stroke, clamping force, preload, and air gaps used in the clamping brake 104 may be fully adjustable based on various design parameters of the clamping brake 104. Example design parameters of the clamping brake 104 that may be controlled or adjusted here can include the length of the handle 324, the amount of charging for the chargeable springs 308, the configuration of the preloads 312, and the diameters of the eccentrics 328 and/or the extent to which the eccentrics 328 are asymmetrical.

Although FIGS. 3 and 4 illustrate a first example of an ultra-clean manually-actuated clamping brake 104 and FIGS. 5 through 7 illustrate examples of cross-sections of the ultra-clean manually-actuated clamping brake 104, various changes may be made to FIGS. 3 through 7. For example, the size, shape, and dimensions of each component in the clamping brake 104 can vary as needed or desired. Also, various components of the clamping brake 104 in FIGS. 3 through 7 may be combined, further subdivided, replicated, omitted, or rearranged and additional components may be added according to particular needs.

Figure 10:
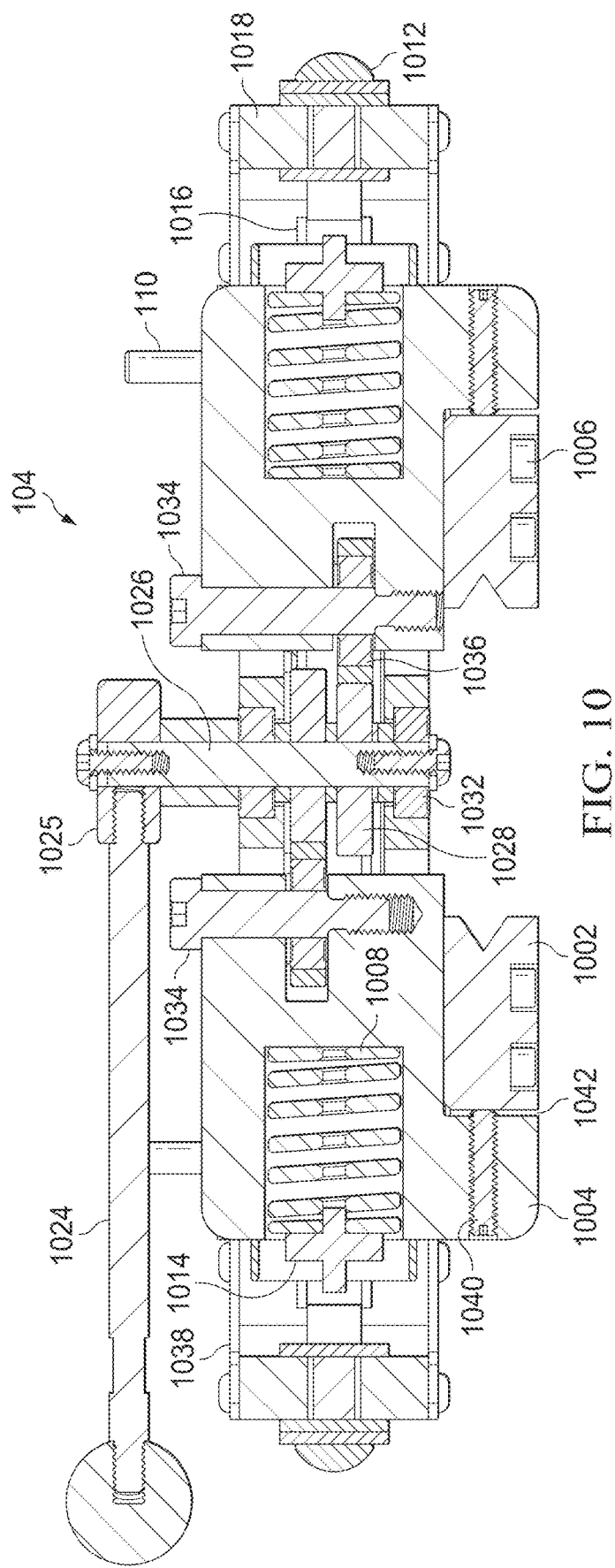
FIG. 10 illustrates a second example ultra-clean manually-actuated clamping brake according to this disclosure.

FIG. 10 illustrates a second example ultra-clean manually-actuated clamping brake 104 according to this disclosure. In particular, FIG. 10 illustrates a cross-section of another example embodiment of a clamping brake 104. As shown in FIG. 10, the clamping brake 104 includes brake pads 1002, mounting blocks 1004, connectors 1006, linear bearing blocks 1014, an internal rail 1016, a chassis 1018, a handle 1024, a coupling arrangement 1025, a camshaft 1026, eccentrics 1028, bearings 1032, bolts 1034, actuation bearings 1036, and labels 1038. These components may be the same as or similar to corresponding components described above with reference to FIGS. 3 through 7. In this example, the handle 1024 is shown as being substantially straight, although this need not be the case. While not shown here, note that the connectors 320, connectors 322, and key stocks 330 may be used in FIG. 10 and may be the same as or similar to corresponding components described above with reference to FIGS. 3 through 7.

The clamping brake 104 of FIG. 10 replaces the nitrogen springs or other chargeable springs 308 with die springs 1008. The die springs 1008 represent springs formed from stainless steel or other material(s) formed in a coil to provide a desired spring force. The thickness of the material(s) forming the springs 1008, the number of coils, the spacing of the coils, or other design parameters for the springs 1008 can be selected as needed or desired. In the clamping brake 104 of FIG. 10, preloads 1012 having a somewhat different form than the preloads 312 are used here, but the preloads 1012 can still operate in the same or similar manner by increasing or decreasing the spring force supplied by the die springs 1008 on the mounting blocks 1004. The preloads 1012 here are simply modified to engage with die springs 1008 rather than chargeable springs 308. In addition, in this example, set screws 1040 can be used to create or define air gaps 1042 between the brake pads 1002 and the mounting block 1004.

Although FIG. 10 illustrates a second example of an ultra-clean manually-actuated clamping brake 104, various changes may be made to FIG. 10. For example, the size, shape, and dimensions of each component in the clamping brake 104 can vary as needed or desired. Also, various components of the clamping brake 104 in FIG. 10 may be combined, further subdivided, replicated, omitted, or rearranged and additional components may be added according to particular needs. Further, structures other than chargeable springs 308 and die springs 1008 may be used to provide desired spring forces in a clamping brake. In addition, one, some, or all of the features that are shown in FIGS. 3 through 7 and that are not shown in FIG. 10 may be used in FIG. 10 (and vice versa). Thus, for instance, the set screws 1040 may be used in FIGS. 3 through 7 to control air gaps 1042 in that clamping brake 104.

Figure 11:
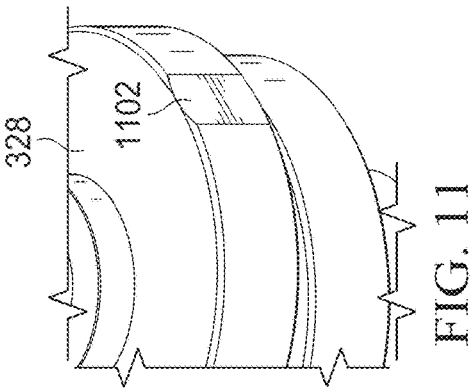
FIG. 11 illustrates an example mechanism that prevents inadvertent or undesired movement of a handle of an ultra-clean manually-actuated clamping brake according to this disclosure.

FIG. 11 illustrates an example mechanism that prevents inadvertent or undesired movement of a handle of an ultra-clean manually-actuated clamping brake according to this disclosure. More specifically, in this example, one or more of the eccentrics 328 can include a detent 1102. Each detent 1102 represents a recessed or other portion along the outer diameter of an eccentric 328 that can resist rotation. As a particular example, each detent 1102 may represent a concave surface, such as one that matches or substantially matches the convex surface of one of the actuation bearings 336. When the detent 1102 is positioned against part of an actuation bearing 336, this can help to hold the eccentric 328 in position and resist inadvertent or undesired rotation of the handle 324.

In FIG. 11, a single detent 1102 in one of the eccentrics 328 is shown. The other eccentric 328 may or may not include a similar detent 1102. The one or more detents 1102 may be positioned on one or more of the eccentrics 328 so that the detent(s) 1102 can push against a portion of one or more actuation bearings 336 when the handle 324 is in the locked position, which can help to keep the handle in the locked position until adequate force is applied to the handle 324. If needed or desired, one or more additional detents 1102 may be positioned on one or more of the eccentrics 328 so that the detent(s) 1102 can push against a portion of one or more actuation bearings 336 when the handle 324 is in the unlocked position, which can help to keep the handle in the unlocked position until adequate force is applied to the handle 324.

Although FIG. 11 illustrates one example of a mechanism that prevents inadvertent or undesired movement of a handle of an ultra-clean manually-actuated clamping brake 104, various changes may be made to FIG. 11. For example, other mechanisms besides detents 1102 may be used to resist inadvertent or undesired movement of a handle of a clamping brake 104.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
multiple brake pads configured to be moved inward to lock onto a rail and to be moved outward to release the rail;
multiple springs configured to apply spring forces that cause the brake pads to move inward and lock onto the rail; and
a camshaft coupled to or comprising multiple eccentrics, the eccentrics configured to overcome the spring forces and cause the brake pads to move outward and release the rail.

2. The apparatus of claim 1, further comprising:
multiple mounting blocks each coupled to a respective one of the brake pads;
wherein the springs are configured to apply the spring forces against the mounting blocks to cause the brake pads to move inward and lock onto the rail; and
wherein the eccentrics are configured to push the mounting blocks outward to cause the brake pads to move outward and release the rail.

3. The apparatus of claim 2, further comprising:
multiple bearings each coupled to a respective one of the mounting blocks;
wherein the bearings are configured to rotate against the eccentrics as the mounting blocks move inward or outward when the eccentrics are rotated.

4. The apparatus of claim 2, further comprising:
a linear bearing comprising an internal rail and multiple linear bearing blocks;
wherein each linear bearing block is coupled to a respective one of the mounting blocks; and
wherein the linear bearing blocks are configured to slide along the internal rail.

5. The apparatus of claim 2, wherein:
the brake pads are modular; and
the mounting blocks are configured to be coupled to at least one of: brake pads formed from different materials and brake pads configured for use with different types or profiles of rails.

6. The apparatus of claim 1, wherein:
the springs comprise chargeable springs; and
each chargeable spring is configured to be charged to a desired level in order to achieve a desired spring force.

7. The apparatus of claim 1, further comprising:
multiple preloads each configured to adjust the spring force provided by a respective one of the springs.

8. The apparatus of claim 1, further comprising:
a handle coupled to the camshaft and configured to rotate the camshaft.

9. The apparatus of claim 1, further comprising:
multiple bearings positioned around the camshaft and separating the camshaft from a chassis.

10. A system comprising:
a carriage configured to move along a rail; and
a clamping brake configured to selectively allow and prevent movement of the carriage along the rail, wherein the clamping brake comprises:
multiple brake pads configured to be moved inward to lock onto the rail and to be moved outward to release the rail;
multiple springs configured to apply spring forces that cause the brake pads to move inward and lock onto the rail; and
a camshaft coupled to or comprising multiple eccentrics, the eccentrics configured to overcome the spring forces and cause the brake pads to move outward and release the rail.

11. The system of claim 10, wherein:
the clamping brake further comprises multiple mounting blocks each coupled to a respective one of the brake pads;
the springs are configured to apply the spring forces against the mounting blocks to cause the brake pads to move inward and lock onto the rail; and
the eccentrics are configured to push the mounting blocks outward to cause the brake pads to move outward and release the rail.

12. The system of claim 11, wherein:
the clamping brake further comprises multiple bearings each coupled to a respective one of the mounting blocks; and the bearings are configured to rotate against the eccentrics as the mounting blocks move inward or outward when the eccentrics are rotated.

13. The system of claim 11, wherein:
the clamping brake further comprises a linear bearing comprising an internal rail and multiple linear bearing blocks;
each linear bearing block is coupled to a respective one of the mounting blocks; and
the linear bearing blocks are configured to slide along the internal rail.

14. The system of claim 11, wherein:
the brake pads are modular; and
the mounting blocks are configured to be coupled to at least one of: brake pads formed from different materials and brake pads configured for use with different types or profiles of rails.

15. The system of claim 10, wherein:
the springs comprise chargeable springs; and
each chargeable spring is configured to be charged to a desired level in order to achieve a desired spring force.

16. The system of claim 10, wherein the clamping brake further comprises multiple preloads each configured to adjust the spring force provided by a respective one of the springs.

17. The system of claim 10, wherein the clamping brake further comprises a handle coupled to the camshaft and configured to rotate the camshaft.

18. The system of claim 10, wherein the clamping brake further comprises multiple bearings positioned around the camshaft and separating the camshaft from a chassis.

19. The system of claim 10, wherein the carriage is configured to transport one or more materials or objects between locations.

20. A method comprising:
applying spring forces that cause multiple brake pads to move inward and lock onto a rail;
rotating a camshaft coupled to or comprising multiple eccentrics; and
overcoming the spring forces using the eccentrics and causing the brake pads to move outward and release the rail.

* * * * *